US005195215A

United States Patent [19]

Kiefer

[11] Patent Number: 5,195,215

[45] Date of Patent: Mar. 23, 1993

[54] HINGE ARM

[75] Inventor: James Kiefer, Grand Rapids, Mich.

[73] Assignee: RAN Enterprises, Inc., Grand Rapids, Mich.

[21] Appl. No.: 744,523

[22] Filed: Aug. 13, 1991

[51] Int. Cl.[5] .......................... E05D 5/02; E05D 11/00; B62D 25/10

[52] U.S. Cl. ........................................ 16/387; 16/223; 296/76

[58] Field of Search ......... 16/387, 382, 223, DIG. 42; 29/11; 296/76

[56] References Cited

U.S. PATENT DOCUMENTS

| | | | |
|---|---|---|---|
| 1,036,734 | 8/1912 | Sessions | 16/387 |
| 2,871,505 | 2/1959 | Clark et al. | 296/76 |
| 3,857,625 | 12/1974 | Crane et al. | 16/223 |
| 4,353,146 | 10/1982 | Brockhaus | 16/387 |
| 4,776,626 | 10/1988 | Seyler | 296/76 |
| 4,893,863 | 1/1990 | Skonieczny et al. | 296/76 |

FOREIGN PATENT DOCUMENTS

| | | | |
|---|---|---|---|
| 3035500 | 5/1982 | Fed. Rep. of Germany | 16/387 |
| 497 | 11/1892 | United Kingdom | 16/387 |

OTHER PUBLICATIONS

Exhibit A is a drawing of a tubular hinge drawn by James Kiefer, the inventor, and dated Feb. 7, 1990. The drawing was given to Chrysler on or about Feb. 7, 1990.

Exhibit B is a drawings of a tubular hinge drawn by James Kiefer, the inventor, and dated Feb. 14, 1990. The drawing was given to Chrysler on or about Feb. 16, 1990.

Exhibit C is a drawing of a tubular hinge drawn by James Kiefer, the inventor, and dated Feb. 18, 1990. The drawing was given to Chrysler on or about Feb. 18, 1990.

Exhibit D is a drawing of a tubular hinge drawn by James Kiefer, the inventor, and dated Mar. 8, 1990. The drawing was given to Chrysler on or about Mar. 9, 1990.

Exhibit E is a drawing of a tubular hinge drawn by James Kiefer, the inventor, and dated Apr. 23, 1990. The drawing was given to Chrysler on or about Apr. 23, 1990.

Exhibit F is a drawing of a tubular hinge drawn by James Kiefer, the inventor, and dated Jul. 10, 1990. The drawing was given to Chrysler on or about Jul. 10, 1990.

Photographs Labelled Exhibits G-I illustrate a tubular hinge arm utilized in the trunk of a 1990 Chevrolet Lumina made by General Motors Corp.

Photographs labelled Exhibits M-P illustrate a tubular hinge arm utilized in the trunk of some late 1980 and early 1990 Cadillac automobiles made by General Motors Corp.

*Primary Examiner*—Robert L. Spruill
*Assistant Examiner*—Carmine Cuda
*Attorney, Agent, or Firm*—Price, Heneveld, Cooper, DeWitt & Litton

[57] ABSTRACT

A hinge arm for a vehicle includes a tubular member having a first portion for attaching a panel thereto, a second portion for pivotally mounting to the vehicle, and a third portion for rigidly interconnecting the first and second portions so that the panel can be stably moved in a defined arc between open and closed positions. The first portion is shaped to provide panel attachment and includes a flattened side, two lateral sides extending therefrom, and an opposite side that is partially deformed against the lateral sides to support the flat side. The second portion includes a flattened wall with a transverse hole establishing an axis of rotation, and an extruded support surface extruded from the wall around the hole to improve durability. The third portion rigidly interconnects the first and second portions, and is shaped to avoid interferences on the vehicle, receive wires for routing therein, and provide drainage for moisture collected therein.

35 Claims, 2 Drawing Sheets

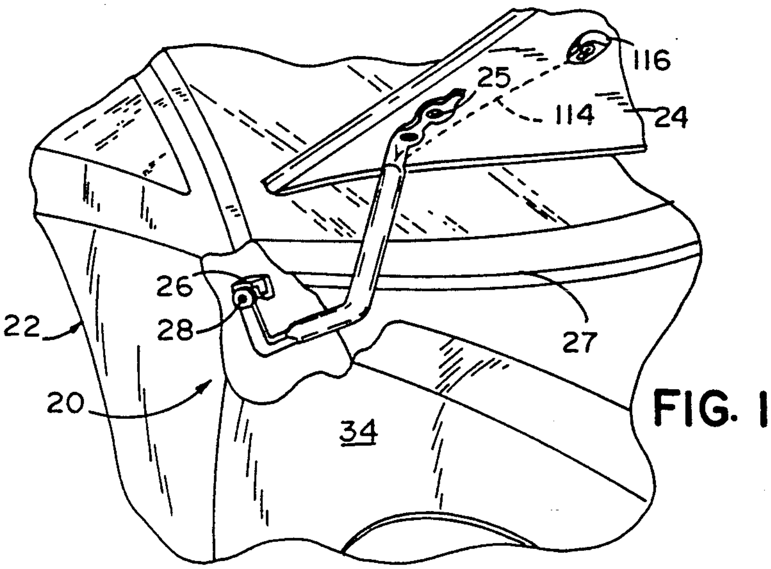
FIG. 1
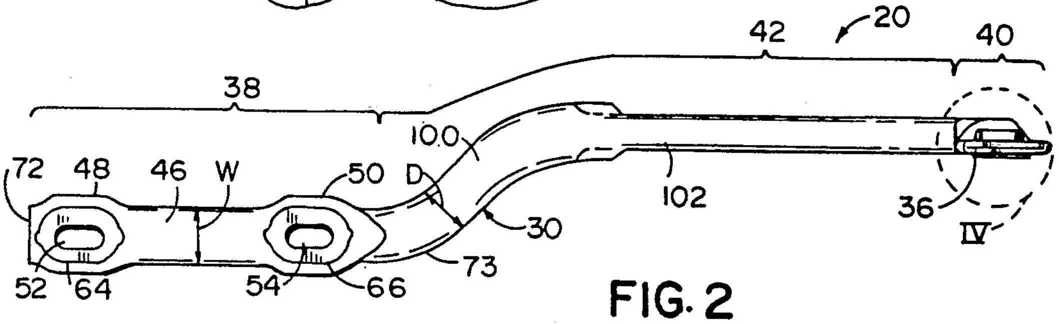
FIG. 2
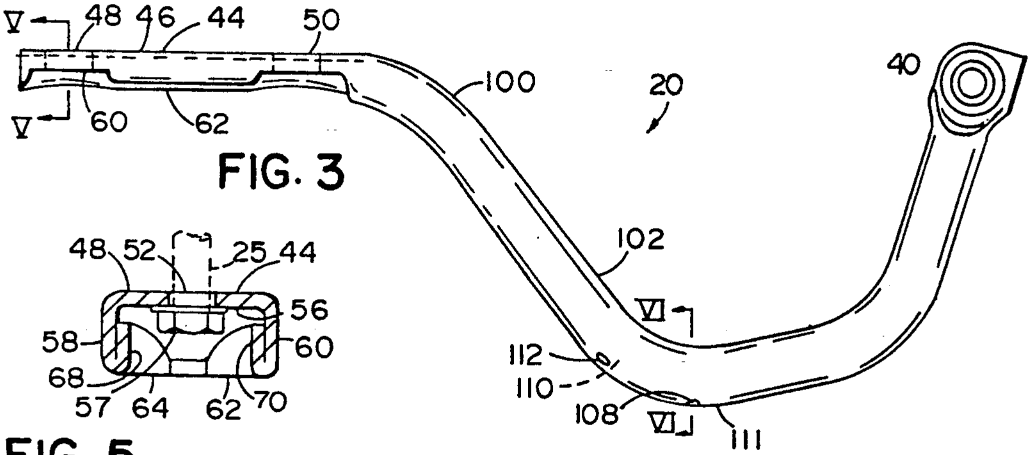
FIG. 3
FIG. 5
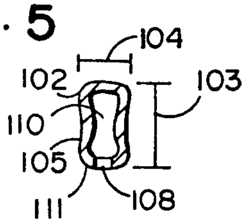
FIG. 6
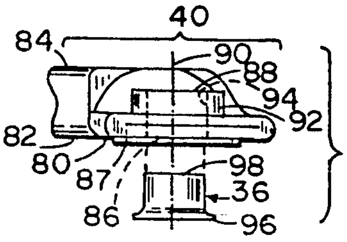
FIG. 4

HINGE ARM

BACKGROUND OF THE INVENTION

The present invention pertains to hinges, and in particular to a recessed hinge for use with large panels.

Modern vehicles and the like often utilize hinged panels such as hoods to aesthetically cover large areas while still providing access thereto. Often the pivotable joint of the hinge is recessed to increase aesthetics and also to provide a secure point of attachment. This necessarily means that the hinge includes an elongate hinge arm that extends from the recessed pivotable joint to the panel.

In the case of an enlarged panel such as a hood, these elongate hinge arms must be strong enough to stably support the weight of the hood, but must be made of a material that is light weight so as to minimize overall vehicular weight and that is readily manufacturable so as to minimize part cost. Further, the hinge arm must stabilize the hood so that the hood does not move laterally and damagingly strike a fender as the hood is closed. Still further, the hinge arm must be shaped to avoid interferences such as engine parts while still providing optimal structural strength, dimensional consistency and manufacturability. Notably, the functional requirements in the hood area are more stringent than, for example, in the trunk area due to the size of the hood panel, the visibility of the hood to a person sitting in or entering the vehicle, the amount of interferences in the engine compartment that must be avoided, and the limited space available in the engine compartment.

Manufacturers have attempted to solve these problems by providing a stamped hinge arm with stiffening flanges formed thereon and brackets welded thereto. However, this results in the hinge arms being heavy and expensive due to the thickness of metal required for proper stiffness. Further, the brackets require subsequent expensive welding operations. Additionally, the stamped hinge arms often lack the desired level of stiffness to prevent the hood from swaying laterally into one of fenders as the hood is closed. This is a problem both during assembly of the vehicle as well as during service of the vehicle.

Also desirable is a hinge arm that reduces the need for secondary parts such as grounding wires or wiring routing clips.

Thus, a hinge arm is needed that solves the above problems by providing an article that can be readily manufactured, has a high strength to weight ratio, and can reduce the need for secondary parts.

SUMMARY OF THE INVENTION

The present invention provides a hinge arm for a vehicle, the hinge arm including a rigid elongate tubular member formed into a three-dimensional shape that is attachable interconnectingly between a panel and the vehicle so as to allow the panel to move in a defined arc between open and closed positions on the vehicle so that the panel does not damagingly sway into adjacent parts of the vehicle as it is closed, the various portions of the hinge arm being integrally formed from the tubular member.

In one form, the invention is embodied in a hinge arm including a tubular member having a first portion for attaching a panel to the hinge arm, a second portion for pivotally mounting the hinge arm to a vehicle, and a third portion interconnecting the first and second portions. The first portion includes an attachment means for the panel, the attachment means including a flattened side useful as a support surface for the panel, and first apertures for receiving fasteners to attach the panel to the tubular member. An opposite side opposite the flattened side includes second apertures that allow the fasteners to be positioned in the first apertures and against the inner surface of the flattened side. Additionally, the second portion includes a transverse hole establishing an axis of rotation for the panel.

In a preferred embodiment, the flattened side of the first portion includes an enlarged support surface around the first apertures for supporting a panel thereon. Also in the preferred form, the opposite side includes flanges that are deformed to support lateral sides that extend from the flattened side toward the opposite side, thereby stabilizing the cross-sectional shape.

Further in the preferred form, the second portion includes a flattened wall section with a cylindrically-shaped extruded support structure extruded from the wall section to form the transverse hole for supporting a hinge pin therein. The extruded support structure increases strength, reduces wear, and also acts to contact the pivot pin so as to electrically ground the hinge arm to the vehicle, which is preferably formed from an electrically conductive metal tube.

Further in the preferred form, the third portion includes a segment having a non-circular cross-section that is dimensionally greater in a first direction for increased strength to support the weight of the panel and smaller in a second direction which is normal to the first to provide greater clearance for interferences on the vehicle.

In another form, the invention is embodied in a hinge arm including a tubular member having a first portion including a flattened side and opposite side with apertures therein for attaching a panel thereto, the flattened side including enlarged support surfaces that are dimensionally wider than the width of the first portion for supporting the panel. The hinge arm also includes a second portion providing a pivot means for pivotally attaching the panel to the vehicle, and a third portion interconnecting the first and second portions.

In still another form, the invention is embodied in a hinge arm including a tubular member having a first portion including a flattened side and an opposite side with apertures therein for attaching a panel thereto, a second portion for pivotally attaching the hinge arm to a vehicle, and a third portion interconnecting the first and second portions. The third portion includes a segment with a non-circular cross-section that is greater in one dimension for increased strength and lesser in a second dimension for increased clearance. The third portion also includes a drain hole to drain away moisture trapped therein.

In still another form, the invention is embodied in a hinge arm including a tubular member having a first portion including a flattened side and an opposite side with apertures therein for attaching a panel thereon, a second portion for pivotally attaching the hinge arm to a vehicle, and a third portion interconnecting the first and second portions. The second portion includes a flattened wall section with a transverse hole therein defining an axis of rotation, and a cylindrically-shaped extruded support structure having an elongated bearing surface extruded in the direction of the axis of rotation to define the transverse hole so that a hinge pin can be supported in the transverse hole without damage or excessive wear to the wall section during use.

As will be understood from the invention, numerous advantages over the prior known hinge arms are provided by this invention. These include a hinge arm having the advantages of construction from a tubular beam including the advantages of high strength-to-weight ratio and reliability of manufacture. Thus the invention provides equal or increased strength at lower part weight and material cost, and potentially with reduced scrap and waste. The tubular construction is particularly adapted for providing increased lateral strength and stability to panels attached thereto, and thus reduces panel closure accidents by reducing the tendency to close panels in a laterally offset position, such as closing the hood damagingly onto a fender. Further, the hinge arm can be readily shaped and formed so as to provide an integral structure for both secure attachment of the panel to the hinge arm and also for pivotal attachment of the hinge arm to a vehicle. These integral structures eliminate the need for add-on brackets or welding in the manufacture of the hinge arm, thus simplifying manufacture and reducing the cost of manufacture. Also, the hinge arm is formed substantially from a single tubular beam, thus reducing secondary operations such as welding. Further, the hinge arm of the present invention can act effectively as an electrical ground. Still, further, the tubular shape allows the hinge arm of the present invention to act as a channel for routing wiring to the accessories on the panel, such as a hood light in the case of a hood, and water drainage is provided through appropriate apertures.

These and other objects, advantages, purposes and features of the invention will become more apparent from a study of the following description taken in conjunction with the drawings.

BRIEF DESCRIPTION OF THE DRAWINGS

FIG. 1 is a partially broken away perspective view of a hinge arm embodying the present invention installed in a vehicle;

FIG. 2 is a plan view of the hinge arm in FIG. 1;

FIG. 3 is a side view of the hinge arm in FIG. 1;

FIG. 4 is an enlarged top view of the circled portion IV in FIG. 1 with a conductive insert exploded away;

FIG. 5 is an enlarged cross-sectional view taken along the plane V—V in FIG. 3;

FIG. 6 is an enlarged cross-sectional view taken along the plane VI—VI in FIG. 3;

BRIEF DESCRIPTION OF THE PREFERRED EMBODIMENT

Figure 7:
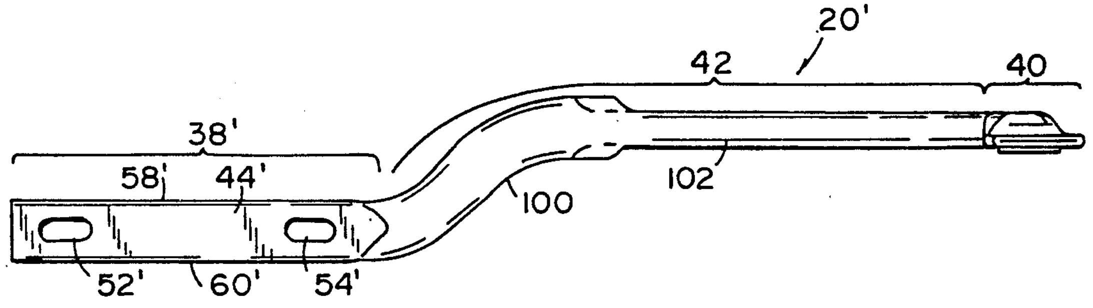
FIG. 7 is a plan view of a second embodiment of the hinge arm embodying the present invention.

Referring now to the drawings and the embodiments illustrated therein, a hinge arm 20 embodying the present invention is shown in FIG. 1 as installed on a vehicle 22. Hinge arm 20 securely attaches to a panel such as a hood 24 by fasteners 25, and pivotally attaches to a recessed mounting structure 26 on vehicle 22 under cowl 27 such as by pivot or hinge pin 28. Hinge arm 20 (FIGS. 2–3) is constructed of a rigid elongate tubular member 30 of sufficient strength so that it can direct hood 24 along a defined arc such that hood 24 does not become laterally unstable and move laterally damagingly into an adjacent part during closure such as illustrated fender 34.

In the preferred embodiment, hinge arm 20 is made of a rigid elongate tubular member 30 (FIGS. 2–6) and a conductive insert or bushing 36 (FIG. 4). Rigid tubular member 30 includes a first portion 38 shaped to provide means for attaching hood 24 thereto, a second portion 40 shaped to provide means for pivoting hood 24 between open and closed positions, and a third portion 42 rigidly interconnecting portions 38 and 40. Third portion 42 is shaped to stably support hood 24 yet avoid interferences (not shown) on vehicle 22 as hood 24 is moved between the open and closed positions. Conductive insert 36 cooperates with metallic, electrically conductive tubular member 30 to provide an electrical ground for hood 24 to vehicle 22, and also to increase the durability of hinge arm 20 as it is pivoted on pivot pin 28.

First portion 38 (FIGS. 2 and 3) is located near an end of tubular member 30 and generally provides the attachment means for attaching hood 24 to tubular member 30. First portion 38 includes a flattened side 44 which provides a substantially flat support surface 46 that abuts and supports hood 24 against tubular member 30. Support surface 46 includes a width W that is generally equal to or slightly larger than the diameter D of tubular member 30, but further includes two spaced and enlarged support surfaces 48 and 50 that provide an additionally wide bearing surface for supporting the mating surfaces of hood 24. Centrally located within enlarged support surfaces 48 and 50 are attachment slots or apertures 52 and 54. Fasteners 25 include heads 57 (FIG. 5) that bear against the inside surface 56 of flattened side 44 so as to draw tubular member 30 securely and fixedly against mating surfaces on hood 24. The first portion 38 also includes lateral sides 58 and 60 and opposite side 62 that join with flattened side 44 to form the tubular shape of first portion 38. Opposite side 62 includes a second pair of apertures 64 and 66 located in alignment with apertures 52 and 54. Apertures 64 and 66 are slightly larger than apertures 52 and 54, and thereby allow fasteners 55 having heads 57 larger than apertures 52 and 54 to be placed through first apertures 64, 66 and against inside surface 56. Apertures 64 and 66 further allow a tool (not shown) such as a socket to be placed therein for driving fasteners 55 to a home position.

In the preferred embodiment, two flanges 68 and 70 (FIG. 5) located on either side of apertures 64 and 66 are folded outwardly against lateral sides 58 and 60 to reinforce same on either side of apertures 52 and 54. This both enlarges the size of apertures 64 and 66 as is needed for receiving a tool therein, and also supports lateral sides 58 and 60 adjacent apertures 52 and 54 as is needed for optimal distribution of stress. The resulting cross-sectional shape of first portion 38 across enlarged support surfaces 48 and 50 is a U-shaped cross-section (FIG. 5) which is formed by lateral sides 58, 60, flanges 68 and 70, and flattened side 44. This U-shaped cross-section is several times stronger than a cross-section where the lateral sides are not supported by flanges. This added strength translates into a reduction of undesirable lateral movement of hood 24. Enlarged support surfaces 48 and 50 also provide an increased moment arm across their wide to more stably support hood 24 and reduce undesired lateral movement thereof.

Longitudinally, flattened side 44 of first portion 38 is long enough and apertures 52 and 54 are spaced far enough apart to give first portion 38 a sufficient moment arm to adequately support hood 24 without bending hood 24. Also, aperture 52 is located a sufficient distance from the end 72 of tubular member 30 and aperture 54 is located a sufficient distance from the first major bend 73 in third portion 42 of tubular member 30 to allow first portion 38 to be satisfactorily and consistently formed during manufacture. This distance will vary depending upon the particular shape of hinge arm 20 and the manufacturing equipment.

Second portion 40 is formed on the opposite end of tubular member 30 from first portion 38. Second portion 40 (FIG. 4) includes opposing sides 82 and 84 that are deformed against each other to form flattened wall section 80. Flattened wall section 80 includes a flat bearing surface 86 on raised embossment 87 formed on at least one side thereof. A transverse hole 88 is formed perpendicularly through flattened wall section 80 and defines an axis of rotation 90 which is the axis of rotation of the hinge. To increase the mechanical strength of second portion 40, a cylindrically-shaped extruded support structure 92 is extruded in the direction of axis 90 to form the bearing surface 9 defining transverse hole 88. By being extruded, bearing surface 94 is enlarged as opposed to a drilled hole and also work hardened, thereby providing improved bearing properties. Extruded support structure 92 mechanically interconnects opposing sides 82 and 84 to increase the strength of second portion 40 thus increasing the overall durability and structural strength of transverse hole 88 as a pivot means.

It is contemplated that a conductive insert 36 can be placed within transverse hole 88 on bearing surface 94 to further increase the durability of second portion 40 as a pivot means, and also to increase the electrical conductivity of tubular member 30 at second portion 40. Conductive insert 36 can be of a variety of shapes, only one of which is shown. The illustrated insert 36 is a tubular shape with a preformed flange 96 on one end. After placing within transverse hole 88, the other end 98 is flanged to retain insert 36 within transverse hole 88. It is contemplated that conductive insert 36 will be made of 70/30 brass of about 0.016 inch thickness.

Rigid elongate tubular member 30 (FIGS. 2 and 3) also includes a third portion 42 that rigidly interconnects first portion 38 with second portion 40, third portion 42 including the substantial length of tubular member 30. Third portion 42 has a longitudinal length formed into a complex three-dimensional part with varying cross-sectional shapes as is desired to avoid interferences within vehicle 22 as hinge arm 20 and hood 24 are moved between open and closed positions. The shape of third portion 42 also optimizes the strength of hinge arm 20 for supporting hood 24 on vehicle 22.

In the embodiment shown third portion 42 includes a cylindrical portion 100 with diameter D, cylindrical portion 100 extending from first portion 38 laterally outwardly and downwardly to a rectangularly-shaped portion 102, and rectangularly-shaped portion 102 extending from cylindrical portion 100 to second portion 40. Rectangularly-shaped portion 102 (FIG. 6) includes a narrowed width 104 designed to avoid interferences within vehicle 22. Rectangularly-shaped portion 102 also includes a vertical dimension 103 that is elongated so that the sidewalls 105 provide additional vertical strength for supporting the weight of hood 24 (FIG. 6). In the embodiment shown, the vertical dimension 103 is not quite twice the horizontal dimension 104; dimension 103 being about 0.90 inches and dimension 104 being about 50 inches. It is also contemplated that the cross-sectional shape of portion 102 could also be ovally shaped as opposed to rectangular.

At or near the lowermost point of third portion 42 is a drain hole 108 that drains away excess moisture collected within the interior 110 of tubular member 30. Drain hole 108 is located along a bottom wall 111 of third portion 42 to prevent collection and puddling of moisture therein, thereby reducing the potential for corrosion and the like from reducing the expected life of hinge arm 20. A wiring access opening 112 is positioned along the length of third portion 42 or substantially anywhere on tubular member 30 allowing access to interior 110 such that wiring can be routed through interior 110 from vehicle 22 to hood 24. Thus, interior 110 acts as a channel for routing wiring 114 (FIG. 1). Such wiring 114 is useful such as for powering accessories on hood 24 such as a hood light 116 (FIG. 1). As noted, hinge arm 20 is metallic, preferably steel, and acts as a ground and therefore eliminates the need for a ground wire by conducting electricity from hood 24 through tubular member 30 (and conductive insert 36 if present), and pivot pin 28 to mounting structure 26 on vehicle 22.

It is contemplated that hinge arm 20 will be substantially entirely made from a material of SAE 1008 or 1015 cold rolled steel shaped into a round walled tube of ⅞ inch diameter and about 0.080 inch thickness walls, although any number of different materials of various thicknesses and hardness could be used.

OPERATION

Having described the preferred embodiment of the invention, the use and advantages of the present invention will become obvious to one skilled in the art. Initially, a piece of tube of the desired material is selected. The tube is then formed and shaped into tubular member 30 having portions 38, 40, and 42. First portion 38 is attached to hood 24 by fasteners 55, the heads 57 of fasteners 55 bearing against inside surface 56 of enlarged support surfaces 48 and 50 to securely tubular member 30 to hold hood 24. Second portion 40 is attached to recessed mounting structure 26 by pivot pin 28. Where increased conductivity or increased durability is desired, a conductive insert 36 is placed within transverse hole 88 of second portion 40 before placing pivot pin 28 therein. Also, raised embossment 87 contacts mounting structure 26 (or conductive insert 36) so as to laterally space hinge arm 20 at an optimal position on vehicle 22, and also to increase conductive contact between hinge arm 20 and vehicle 22.

Electrical wiring 114 is routed through the invention 110 of tubular member 30 by routing wire 114 into access opening 112, through interior 110 and out at first portion 38. Electrical wiring 114 provides electrical power to hood light 116, light 116 being grounded through hood 24 (and conductive insert 36 if present) and tubular member 30 to mounting structure 26 on vehicle 22.

As hood 24 is opened, support for the weight of hood 24 is transferred laterally outwardly through first and third portions 38 and 42 to second portion 40 and mounting structure 26. Hood 24 is guided upwardly through a stable and defined arc due to the rigidity of tubular member 30, and due to the strength and dimensional size of enlarged support surfaces 48 and 50 on first portion 38 and bearing surface 94 on third portion 40. Interferences on vehicle 22 are avoided due to the three-dimensional complex shape of third portion 42 of tubular member 30. As hood 24 is opened, electrical power is supplied to hood light 116 by wiring 114, which is in turn grounded by tubular member 30 to vehicle 22.

As hood 24 is closed, hinge arm 20 directs hood 24 through a defined arc so as to substantially prevent unstable lateral movement, thereby preventing hood 24 from being lowered strikingly into one of fenders 34 located on either side of hood 24.

ALTERNATIVE EMBODIMENT

Figure 8:
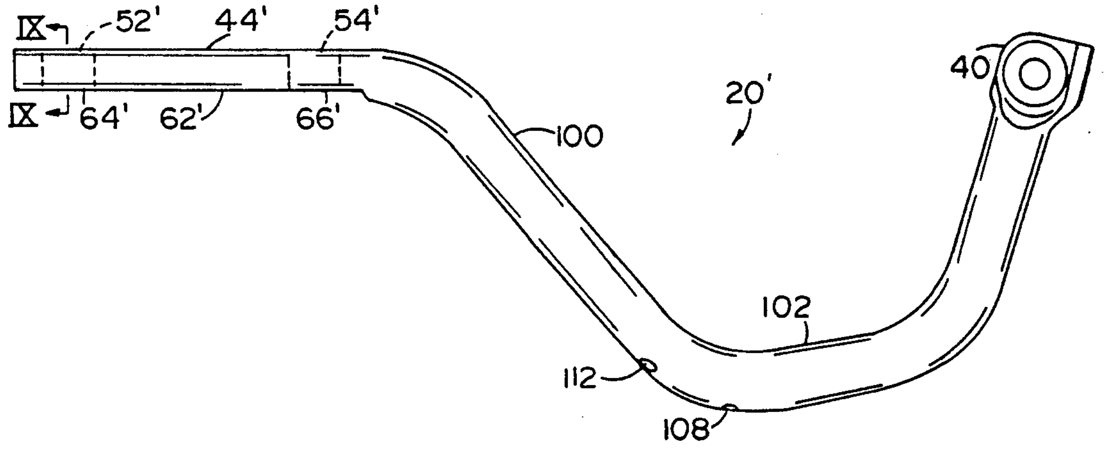
FIG. 8 is a side view of the apparatus in FIG. 7.
Figure 9:
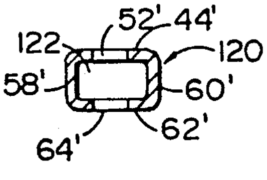
FIG. 9 is a cross-section taken along the plane IX—IX of FIG. 8.

A second embodiment designated as hinge arm 20' embodying the present of the invention is shown in FIGS. 7-9. In this embodiment, the numerals with primes indicate changes from the first embodiment, with other items remaining substantially unchanged. In this embodiment, first portion 38' includes a rectangular cross-section 120 (FIG. 9) with flattened side 44' spaced from opposite side 62' by lateral sides 58' and 60'. First apertures 52' and 54' are aligned with second apertures 64' and 66', but second apertures 64' and 66' are sized so that heads 57 of fasteners 55 (FIG. 5) engage opposite side 62' (FIG. 9). Portions 40 and 42 are otherwise substantially similar to hinge arm 20.

In the foregoing description it will be readily appreciated by those skilled in the art that modifications may be made to the invention without deviating from the concepts disclosed herein. Such modifications are to be considered as included in the following claims, unless these claims by their language expressly state otherwise.

The embodiments of the invention in which an exclusive property or privilege is claimed are defined as follows:

1. A hinge arm for a vehicle comprising:

a rigid elongate tubular member formed into a three-dimensional shape having first, second and third portions;

said first portion including attachment means integrally formed form said tubular member for attaching a panel thereto, said attachment means including a flattened side having an outer surface useful as a support surface for said panel and an inner surface useful for supporting the head of a fastener, and also including first apertures located in said flattened side and adapted to receive fasteners to attach said panel to said first portion, said first portion further including an opposite side opposite said flattened side, said opposite side including second apertures aligned with said first apertures and adapted to allow said fasteners to be positioned in said first apertures and against said inner surface of said flattened side;

said second portion including a pivot means for pivotally attaching said hinge arm to said vehicle, said pivot means including a transverse hole establishing an axis of rotation so as to pivot said panel between open and closed positions on said vehicle; and said third portion rigidly interconnecting said first and second portions so that said panel moves in a defined arc between said open and closed positions, said third portion having a three dimensional longitudinal shape with sufficient lateral strength along with said first and second portions to prevent said panel from unstably swaying laterally damagingly into adjacent parts on the vehicle as said panel is moved to said closed position, said three-dimensional longitudinal shape being bent in a manner so as to avoid interferences on said vehicle during movement between said open and closed positions and so as to provide rigid interconnection of said panel to said vehicle.

2. The apparatus as set forth in claim 1 wherein said third portion includes a segment having a shaped non-circular cross-section that is dimensionally greater in a first direction than in a second direction oriented normal thereto so as to increase the strength of said segment in said first direction and also to provide greater clearance for interferences on said vehicle in said second direction.

3. The apparatus as set forth in claim 1 wherein said second apertures are larger than said first apertures.

4. The apparatus as set forth in claim 3 wherein said first portion has a width and wherein said flattened side includes an enlarged support surface around said first aperture for abuttingly supporting said panel, said enlarged support surface being dimensionally wider than said width of said first portion.

5. The apparatus as set forth in claim 4 wherein said first portion includes lateral sides connecting said flattened side and said opposite side, said opposite sides including flanges adjacent said second apertures that are deformed to support said lateral sides.

6. The apparatus as set forth in claim 5 wherein said flanges are substantially pressed against and adjacent said lateral sides, said lateral sides and flanges forming a U-shaped cross-sectional pocket with said flattened side for receiving the heads of said fasteners positioned in said first apertures.

7. The apparatus as set forth in claim 1 wherein said first portion includes lateral sides connecting said flattened side and said opposite side, said lateral sides forming a U-shaped cross-sectional pocket with said flattened side for receiving the heads of said fastener positioned in said first apertures.

8. The apparatus as set forth in claim 1 wherein said tubular member includes an interior space defining a channel adapted to receive wiring routed therethrough.

9. The apparatus as set forth in claim 1 wherein said first portion includes lateral sides connecting said flattened side and said opposite side, said opposite sides including flanges adjacent said second apertures that are deformed to support said lateral sides.

10. The apparatus as set forth in claim 1 wherein said second portion includes an access opening for routing wiring through the interior of said tubular member.

11. The apparatus as set forth in claim 1 including a conductive insert bushing positioned within said transverse hole and adapting said hinge arm to act as a ground for said panel.

12. The apparatus as set forth in claim 1 wherein said second portion includes a flattened wall section with said transverse hole therein defining said axis of rotation and a cylindrically-shaped extruded support structure extruded from said wall section in the direction of said axis of rotation thereby defining said transverse hole so that a hinge pin can be supported in said transverse hole without damage or excessive wear to said wall section during use of said hinge arm, said wall section and said extruded support structure adapted to cooperate with a hinge pin and a mounting structure on said vehicle to allow said tubular member and said panel to pivotally move between open and closed positions on said vehicle.

13. The apparatus as set forth in claim 12 wherein said tubular member includes means for conducting electricity and is adapted to act as an electrical ground for said panel.

14. The apparatus as set forth in claim 13 wherein said wall section and said extruded support structure cooperate with said hinge pin on said vehicle to electrically ground said panel to said vehicle.

15. The apparatus as set forth in claim 14 including a conductive insert bushing positioned within said transverse hole in said extruded support structure adapted to receive said hinge pin.

16. The apparatus as set forth in claim 15 wherein said third portion includes an access opening for routing wiring through the interior of said tubular member.

17. The apparatus as set forth in claim 16 wherein said wall section includes a flat bearing surface formed thereon said flat bearing surface being useful for slideably bearing against said mounting structure on said vehicle so as to laterally locate said panel and tubular member on said vehicle.

18. The apparatus as set forth in claim 17 wherein said wall section is formed by deforming opposing sides of said tubular member so that said opposing sides abuttingly support each other.

19. The apparatus as set forth in claim 18 wherein said extruded support structure mechanically interconnects said opposing sides further adding to the strength and durability of said extruded support structure.

20. The apparatus as set forth in claim 12 wherein said wall section is formed by deforming opposing sides of said tubular member so that said opposing sides support each other.

21. The apparatus as set forth in claim 12 wherein said extruded support structure mechanically interconnects the opposing sides of said second portion adjacent said transverse hole to add strength and durability to said extruded support structure and said wall section.

22. A hinge arm for a vehicle comprising:

a rigid elongate tubular member formed into a three-dimensional shape having first, second and third portions;

said first portion including attachment means integrally formed form said tubular member for attaching a panel thereto, said attachment means including a flattened side useful as a support surface for said panel, and also including first apertures located in said flattened side adapted to receive fasteners to attach said panel to said first portion, said first portion further including an opposite side opposite said flattened side, said opposite side including second apertures aligned with said first apertures to allow said fasteners to be positioned through said second apertures into said first apertures, said first portion having a width, said flattened side including an enlarged support surface around said first apertures for abuttingly support said panel, said enlarged support surface being dimensionally wider than said width of said first portion;

said second portion including a pivot means formed from said tubular member establishing an axis of rotation for pivotally attaching said hinge arm to said vehicle so as to pivot said panel between open and closed positions on said vehicle, said second portion including opposing sides deformed against each other to form a flattened double wall section, said pivot means including a transverse hole in said flattened double wall section and an extruded support structure formed by extruding a part of said flattened double wall section through said transverse hole, said extruded support structure interconnecting said opposing sides and being adapted to receive a hinge pin or a pivot bushing; and said third portion rigidly interconnecting said first and second portions so that said panel moves in a defined arc between said open and closed positions, said third portion having a three-dimensional longitudinal shape so as to avoid interferences on said vehicle during movement between said open and closed positions and so as to provide rigid interconnection of said panel to said vehicle.

23. The apparatus as set forth in claim 22 wherein said first portion includes lateral sides connecting said flattened side and said opposite side, said opposite sides including flanges adjacent said second apertures that are deformed to support said lateral sides.

24. The apparatus as set forth in claim 23 wherein said flanges are substantially pressed against and adjacent said lateral sides, said lateral sides and flanges forming a U-shaped cross-sectional pocket with said flattened side for receiving the heads of said fasteners positioned in said first apertures.

25. A hinge arm for the hood panel of a vehicle comprising:

a rigid elongate tubular member formed into a three-dimensional shape having first, second and third portions;

said first portion including attachment means integrally formed from said tubular member for attaching a panel thereto, said attachment means including a flattened side useful as a support surface for said panel and an opposite side opposite said flattened side, said attachment means further including first apertures located in said flattened side and second apertures located in said opposite side and aligned with said first apertures, said first and second apertures adapted to receive fasteners to attach said panel to said first portion;

said second portion including pivot means integrally formed form said tubular member for pivotally attaching said hinge arm to said vehicle so as to pivot said panel between open and closed positions on said vehicle, said second portion including opposing sides deformed against each other to form a flattened double wall section, said pivot means including a transverse hole in said flattened double wall section and an extruded support structure formed by extruding a part of said flattened double wall section through said transverse hole, said extruded support structure interconnecting said opposite sides and being adapted to receive a hinge pin or a pivot bushing; and said third portion rigidly interconnecting said first and second portions so that said panel moves in a defined arc between said open and closed positions, said third portion including a drain hole positioned along a lower surface on said third portion when said tubular member is installed in said vehicle, said drain hole useful to drain away moisture entrapped within said tubular ember, said third portion including a segment having a shaped non-circular cross-section that is dimensionally greater in a first direction than in a second direction oriented normal thereto so as to increase the strength of said segment in said first direction and also to provide increased clearance for interferences on said vehicle in said second direction.

26. The apparatus as set forth in claim 25 wherein said tubular member includes an interior space defining a channel adapted to receive wiring routed therethrough and an access opening for routing wiring into the interior of said tubular member.

27. The apparatus as set forth in claim 25 wherein said tubular member is adapted to act as an electrical ground for said panel.

28. The apparatus as set forth in claim 25 wherein said pivot means includes a transverse hole, and including a conductive insert bushing positioned within said transverse hole and adapting said hinge arm to act as a ground for said panel.

29. A hinge arm for the hood panel of a vehicle comprising:

a rigid elongate tubular member formed into a three-dimensional shape having first, second and third portions;

said first portion including attachment means integrally formed from said tubular member for attaching a panel thereto, said attachment means including a flattened side useful as a support surface for said panel and an opposite side opposite said flattened side, said attachment means further including first apertures located in said flattened side and second apertures located in said opposite side and aligned with said first apertures, said first and second apertures adapted to receive fasteners to attach said panel to said first portion;

said second portion including pivot means integrally formed from said tubular member for pivotally attaching said hinge arm to said vehicle so as to pivot said panel between open and closed positions on said vehicle, said second portion including opposing sides deformed against each other to form a flattened double wall section, said pivot means including a transverse hole in said pivot means including a transverse hole in said pivot means including a transverse hole in said flattened double wall section and an extruded support structure formed by extruding a part of said flattened double wall section through said transverse hole, said extruded support structure interconnecting said opposing sides and being adapted to receive a hinge pin or a pivot bushing; and said third portion rigidly interconnecting said first and second portions so that said panel moves in a defined arc between said open and closed positions, said third portion including a segment having a shaped non-circular cross-section that is dimensionally greater in a first direction than in a second direction oriented normal thereto so as to increase the strength of said segment in said first direction and also to provide increased clearance for interferences on said vehicle in said second direction.

30. A hinge arm for the hood panel of a vehicle comprising:

a rigid elongate tubular member formed into a three-dimensional shape having first, second and third portions;

said first portion including attachment means integrally formed from said tubular member for attaching a panel thereto, said attachment means including a flattened side useful as a support surface for said panel and first apertures located in said flattened side and adapted to receive fasteners to attach said panel to said first portion, said first portion further including an opposite side opposite said flattened side, said opposite side including second apertures aligned with said first apertures;

said second portion integrally formed from said tubular member including a flattened wall section with a transverse hole therein defining an axis of rotation, and a cylindrically-shaped extruded support structure with elongated bearing surface extruded from said wall section in the direction of said axis of rotation thereby defining said transverse hole so that a hinge pin can be supported in said transverse hole without damage or excessive wear to said wall section during use of said hinge arm, said wall section and said extruded support structure being adapted to cooperate with a hinge pin and a mounting structure on said vehicle to allow said tubular member and said panel to pivotally move between open and closed positions on said vehicle: and said third portion rigidly interconnecting said first and second portions so that said panel moves in a defined arc between said open and closed positions, said third portion including a drain hole positioned along a lower surface on said third portion when said tubular member is installed in said vehicle, said drain hole useful to drain away moisture entrapped within said tubular member, said third portion having a complex three dimensional longitudinal shape with sufficient lateral strength along with said first and second portions to prevent said panel from unstably swaying laterally damagingly into adjacent parts on the vehicle as said panel is moved to said closed position, said three-dimensional longitudinal shape being bent in a manner so as to avoid interferences on said vehicle during movement between said open and closed positions and so as to provide rigid interconnection of said panel to said vehicle.

31. The apparatus as set forth in claim 30 wherein said tubular member includes an interior space defining a channel adapted to receive wiring routed therethrough and an access opening for routing wiring into the interior of said tubular member.

32. The apparatus as set forth in claim 30 wherein said tubular member is adapted to act as an electrical ground for said panel.

33. The apparatus as set forth in claim 30 wherein said pivot means includes a transverse hole, and including a conductive insert bushing positioned within said transverse hole and adapting said hinge arm to act as a ground for said panel.

34. The apparatus as set forth in claim 30 wherein said flattened wall section includes an embossment on one of the opposing sides around said transverse hole.

35. The apparatus as set forth in claim 34 wherein said extruded support structure extends laterally form said flattened wall section in a direction opposite said embossment.

* * * * *

UNITED STATES PATENT AND TRADEMARK OFFICE
CERTIFICATE OF CORRECTION

PATENT NO. : 5,195,215

DATED : March 23, 1993

INVENTOR(S) : James Kiefer

It is certified that error appears in the above-identified patent and that said Letters Patent is hereby corrected as shown below:

Column 5, line 25;
"surface 9" should be --surface 94--.

Column 6, line 5;
"about 50" should be --about .50--.

Column 7, line 44;
"form" should be --from--.

Column 9, line 47;
"form" should be --from--.

Column 9, line 60;
"abuttingly support" should be --abuttingly supporting--.

Column 10, line 29;
After "for" delete --the hood panel of--.

Column 10, line 46;
"form" should be --from--.

Column 10, lines 56 and 57;
"opposite" should be --opposing--.

Column 10, line 66;
"ember" should be --member--.

UNITED STATES PATENT AND TRADEMARK OFFICE
CERTIFICATE OF CORRECTION

PATENT NO. : 5,195,215

DATED : March 23, 1993

INVENTOR(S) : James Kiefer

It is certified that error appears in the above-identified patent and that said Letters Patent is hereby corrected as shown below:

Column 11, line 19;
After "for" delete --the hood panel of--.

Column 11, lines 42 and 43;
After "pivot means" delete --including a transverse hole in said pivot means--.

Column 12, line 62;
"form" should be --from--.

Signed and Sealed this

Twelfth Day of April, 1994

*Attest:*

BRUCE LEHMAN

*Attesting Officer*

*Commissioner of Patents and Trademarks*